Dec. 16, 1952    J. C. BENDER ET AL    2,622,126
CONFORMABLE COIL
Filed Sept. 20, 1948
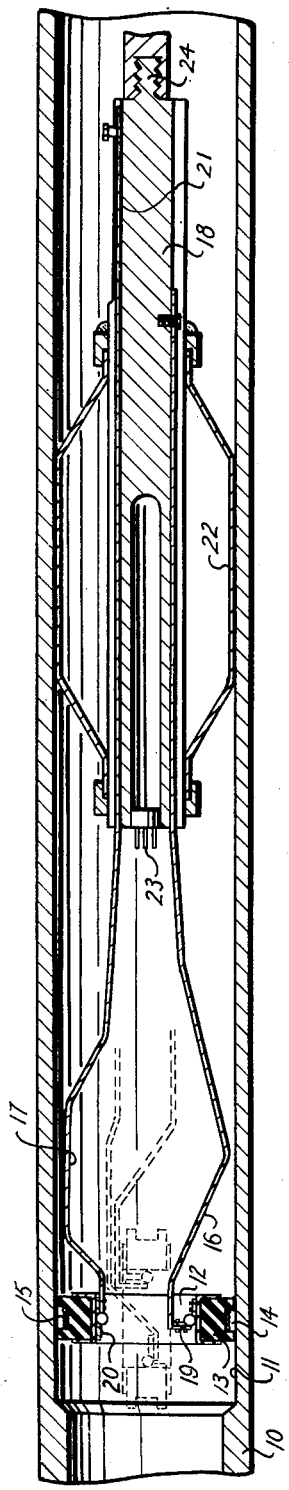
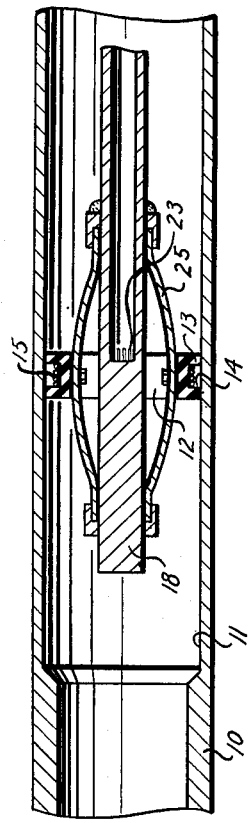
Clarence T. Baker
John C. Bender
INVENTOR.
BY James F. Weiler
ATTORNEY Patented Dec. 16, 1952

2,622,126

UNITED STATES PATENT OFFICE 2,622,126

CONFORMABLE COIL

John C. Bender and Clarence T. Baker, Houston, Tex., assignors to Houston Oil Field Material Company, Inc., Houston, Tex., a corporation of Delaware Application September 20, 1948, Serial No. 50,124

2 Claims. (Cl. 175—183)

1

This invention relates to the testing of materials to determine variations or defects therein and relates more particularly to a method and means to test materials of irregular internal contour.

There are many and numerous methods and apparatus for the testing of materials to determine variations or defects therein. One of these methods consists of maintaining a sustained oscillation of resonant frequency in an oscillatory circuit and successively electromagnetically coupling different small portions of the material being tested with the circuit whereby changes in the electrical characteristics of the material being tested due to defects or variations therein produce changes in this frequency. These changes may be indicated in many ways such as by sonic or visual means. Such a means and method is disclosed in the patent to Dana, No. 1,984,465, issued December 18, 1934, as applied to electrical conductors.

The above method and further and similar ones in the art have not been used in testing materials of irregular internal contour due to the difficulty in securing satisfactory results in that an exploratory coil inserted into internal contours of irregular configuration is limited in size by the minimum orifice therein and does not effectively electromagnetically couple successive portions of the material being tested.

It is among the objects of our invention to provide a method and means to produce a radio frequency electromagnetic field with the axis and at right angles to the axis of the material being tested.

It is a further object to provide a means to produce a magnetic field which will conform to and follow the path of the irregular internal contour of the material being tested so that defects or variations in the material will produce changes in an oscillatory circuit maintained at resonant frequency so that such frequency may be heterodyned with a current from an oscillating generator of constant frequency in order that the changes in beat frequency therebetween may be observed.

It is a particular object to provide an exploratory coil which will effectively and efficiently electromagnetically couple successive portions of ferrous or non-ferrous pipe, such as internal upset pipe.

It is a particular and further object to provide an exploratory coil which may be effectively and efficiently used in electric, electromagnetic or electronic methods of inspecting ferrous or non-ferrous material for defects, flaws or variations.

2

A feature of the invention is the provision of an exploratory coil which will conform to the internal contour of the material being tested.

In the co-pending application filed September 20, 1948, bearing Serial Number 50,123, a method and different means is disclosed and claimed to accomplish the above objects.

It is a further feature of our invention to provide an exploratory coil which will detect longitudinal and transverse defects and variations by manipulation of the coil.

It is a further feature of our invention to provide an exploratory coil which will detect longitudinal and transverse defects and variations by manipulation of the coil.

Other objects and advantages are apparent from the following description of a preferred embodiment of our invention taken in conjunction with the accompanying drawing wherein like reference numerals designate like parts throughout both views, and where:

Figure 1 is a longitudinal, cross-sectional view of our testing device illustrating the use thereof in testing internal upset pipe, and Figure 2 is similar to Figure 1 and illustrates a modification in mounting the coil or winding.

Referring to Figure 1 of the drawing the numeral 10 designates the pipe to be tested which is internally upset at 11. The testing unit, generally designated as 12 is inserted and withdrawn as shown in the dotted lines in Figure 1.

Our testing device comprises a flexible body member 13 which may be of ring-like configuration and formed of rubber or other suitable flexible material which will yieldingly conform to the internal configuration of pipe 10. The body member 13 may have a radial recess 14 disposed in its periphery in which a suitable testing coil or winding 15 is disposed.

Flexible arms 16 and 17 secure body member 13 to guide support 18 and the former are outwardly bowed to aid in positioning coil 15 in axial or longitudinal position with respect to pipe 10. The end of arm 16 is outwardly turned and arms 16 and 17 are pivotally secured to body member 13 by means of hinge plates 19 and 20 respectively. Arm 16 is fixed to guide support 18 and arm 17 is free to move longitudinally along channel 21 of guide support 18. Thus, by moving arm 17 longitudinally, body member 13 may be positioned either longitudinally as shown in dotted lines or axially with respect to the interior walls of pipe 10.

Flexible springs 22 or other means such as retractable rollers and the like may be connected to guide support 18 to properly center or position the testing device in the pipe 10.

An electrical connection 23 is provided to connect the coil 15 to the particular circuit being used in testing the pipe 10. Threads 24 may be provided on the free end of guide support member 18 in order that a telescope may be connected thereto to visually examine any indicated flaws.

In testing an internally upset pipe for flaws or variations, our exploring coil may be inserted into the pipe 10 in the manner illustrated in dotted lines in Figure 1. The coil and body member will readily compress and pass through the narrower opening at the joint. Flexible arm 17 may be manipulated along channel 21 in guide support 18 to bring coil into axial position with respect to the upset portion 11 of the inner walls of the pipe 10 and coil 15 will thus be in close proximity thereto as indicated in Figure 1. Guide springs 22 will center the device and the coil may be urged through the pipe by means of a cord or rod not shown.

Assuming that our testing device is used in connection with an electronic circuit, the coil 15 will set up a radio frequency electromagnetic field in close proximity to the internal walls of pipe 10 as it is moved inside the latter thereby setting up eddy currents in the internal walls thereof and any variations or defects therein will produce changes in the frequency in the oscillatory circuit to which the coil is connected thereby producing changes in the frequency of such circuit which may be indicated by suitable means to the operator. As indicated heretofore, a telescope may be attached to the threaded end 24 of member 18 in order that the operator may visually inspect the flaws or variations indicated by the exploratory coil and associated circuit and indicating means. To aid in such visual inspection a light may be provided in the device.

If desired our coil may be urged through pipe 10 in a longitudinal position as indicated in the dotted lines in Figure 1. By manipulation, transverse defects or flaws or variations, may be observed as described above.

A modification of our coil is illustrated in Figure 2. Here the flexible body member 13 is mounted on flexible fingers 25 which may be of any suitable material, such as spring steel which will yieldingly hold coil 15 against the interior of the pipe thereby permitting the same to conform to the internal configuration thereof. No more description of the modification is given as the other elements are the same as the above-described and so is the manner of operation. In this particular modification, however, the coil may not be pivoted for longitudinal positioning inside the pipe 10.

Our coil may be used in testing flat work or sheets, such as in rolling mills, and in such case, the coil may be formed oblong to provide maximum surface to the material being tested. It is apparent that our coil may be used in connection will all the methods of inspection disclosed in the said co-pending application.

Many modifications in details and substitution of parts and materials may be made in our conformable coil. For example, body member 13 may be made of spring steel, and need not be recessed to receive coil 15, or the body member may be of a sponge rubber or other yielding material and may be solid if desired. Any means may be used to center our coil or to pivot the same for positioning inside a pipe or on flat materials. In testing materials having circular passages, flexible connections or knuckle joints may be employed and by obvious modification our coil may be used to detect variations, flaws or deflects in materials having internal passages of varying configuration. It seems obvious that our testing device is more efficient when used in materials having consistent internal passages than those of the prior art.

We claim:

1. A device for detecting flaws in pipe comprising a ring-like member formed of flexible material adapted to yieldingly conform to the configuration of the internal passage in said pipe, a recess in the periphery of said body member, a coil disposed in said recess and adapted to set up a magnetic field in said pipe as said device is urged therethrough, and means to pivot said body member for easy passage through restricted areas in said pipe.

2. A device for finding variations and flaws in restricted internal passages in materials comprising a body member conformable to the surface of the restricted internal passages, means carried by said body member to produce a magnetic field whereby said means is maintained in maximum inductive relationship with said restricted internal passages, and means to pivot said body member for easy passage through restricted areas in said pipe.

JOHN C. BENDER.
CLARENCE T. BAKER.

REFERENCES CITED

The following references are of record in the file of this patent:

UNITED STATES PATENTS

| Number | Name | Date |
|---|---|---|
| 2,041,053 | Fossati | May 19, 1936 |
| 2,124,579 | Knerr et al. | July 26, 1938 |
| 2,194,229 | Johnston et al. | Mar. 19, 1940 |
| 2,201,256 | Barrett | May 21, 1940 |
| 2,216,600 | Moore | Oct. 1, 1940 |
| 2,220,563 | White | Nov. 5, 1940 |